May 27, 1924.

A. B. CLARK 1,495,221

MEANS FOR AND METHOD OF CONTROLLING TRANSMISSION

Filed April 30, 1918 7 Sheets-Sheet 3

INVENTOR.
A.B.Clark
BY
ATTORNEY

May 27, 1924.

A. B. CLARK 1,495,221

MEANS FOR AND METHOD OF CONTROLLING TRANSMISSION

Filed April 30, 1918     7 Sheets-Sheet 4

INVENTOR.
*A. B. Clark*
BY
ATTORNEY

May 27, 1924.

A. B. CLARK 1,495,221

MEANS FOR AND METHOD OF CONTROLLING TRANSMISSION

Filed April 30, 1918  7 Sheets-Sheet 5

INVENTOR
*A.B.Clark*
BY
ATTORNEY

Patented May 27, 1924.

1,495,221

UNITED STATES PATENT OFFICE.

ALVA B. CLARK, OF BROOKLYN, NEW YORK, ASSIGNOR TO AMERICAN TELEPHONE AND TELEGRAPH COMPANY, A CORPORATION OF NEW YORK.

MEANS FOR AND METHOD OF CONTROLLING TRANSMISSION.

Application filed April 30, 1918. Serial No. 231,776.

*To all whom it may concern:*

Be it known that I, ALVA B. CLARK, residing at Brooklyn, in the county of Kings and State of New York, have invented certain Improvements in Means for and Methods of Controlling Transmission, of which the following is a specification.

This invention relates to transmission circuits and more particularly to means and methods whereby the transmission efficiency of circuits employing so-called four-wire repeaters may be controlled, although said means and methods are applicable to circuits employing repeaters of other types.

In four-wire repeater systems two distant stations are interconnected by two separate transmission paths, one being utilized for transmission in one direction and the other for transmission in the opposite direction. At the terminal stations said paths are connected through a suitable transformer arrangement to terminating two-wire lines and artificial lines for balancing the two-wire lines. One way repeaters are inserted in each transmission path to amplify currents transmitted thereover.

In systems such as above outlined it is desirable that some means be provided in order that the four-wire circuit may be initially adjusted to the transmission equivalent which it is desired to obtain between the terminating stations. It is also desirable that means should be provided whereby this transmission equivalent may be maintained regardless of any changes which may take place from time to time in one or more elements of the four-wire circuit. Furthermore, when the terminating two-wire lines differ considerably, so that some lines contain impedance irregularities such that a four-wire connecting link having but a small transmission loss cannot be used without causing a poor quality of transmission, while other lines are comparatively uniform as to impedance so as to permit of the use of a connecting link having a small transmission loss or in some cases giving an actual gain in transmission, means should be provided to vary the transmission equivalent of the four-wire circuit including the terminating two-wire lines in accordance with the characteristics of different two-wire lines. These results may be accomplished in accordance with the present invention by inserting suitable apparatus in the two sides of the four-wire circuit or in the terminating two-wire lines or both.

The invention may now be more fully understood from the following description when read in connection with the accompanying drawings, Figures 1, 2, 3, 4, 5, 6, 7, 8 and 8ª of which constitute circuit diagrams of different forms of the invention; Figures 10 and 11 of which are alternative forms of impedance elements which may be used in place of the form of impedance elements shown in Figures 1 to 6, inclusive.

Figure 1:
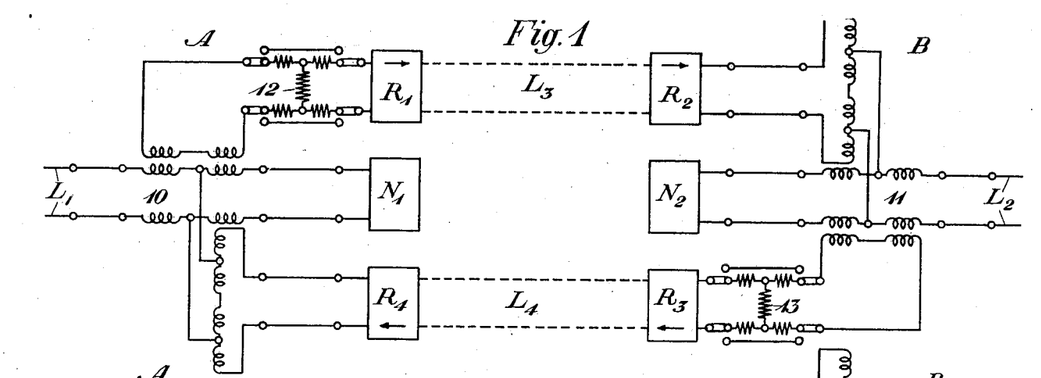
Figure 13:
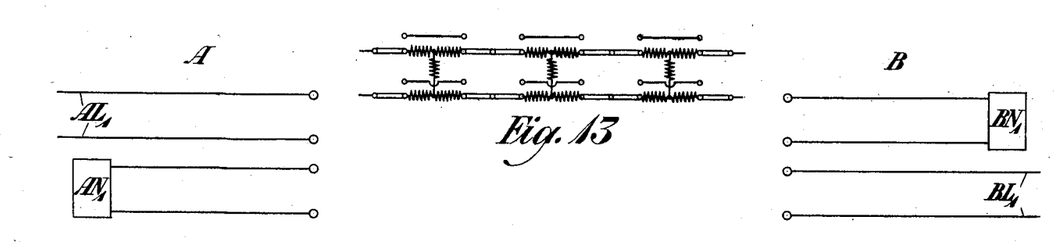
Figure 13 of which illustrates one way of adjusting the impedance element.

Referring now to Figure 1, two stations, A and B, are shown, said stations being in practice arranged a considerable distance apart. At each station a plurality of telephone lines, such as $L_1$ and $L_2$ terminate. In order to connect a line such as $L_1$ at station A with a line such as $L_2$ at station B, a four-wire system is provided, consisting of two separate transmission lines, $L_3$ and $L_4$, extending between the two offices, the line $L_3$ being used for transmission from A to B, and the line $L_4$ for transmission from B to A. One-way repeaters, $R_1$, $R_2$, $R_3$, and $R_4$, may be included in the four-wire circuit as shown, and if desired other repeaters may be inserted at different points along the line. The two transmission lines, $L_3$ and $L_4$, are connected at their ends through three winding induction coils, 10 and 11, to the terminating two-wire lines $L_1$ and $L_2$. In order that a circuit arrangement such as above described may be accurately adjusted to a desired transmission equivalent, impedance elements, such as 12 and 13, may be inserted in the lines $L_3$ and $L_4$, as shown. These impedance elements may comprise series and shunt resistances as shown, the resistances being adjustable, if desired, in order to obtain the desired characteristics. The impedance elements may be removed from the circuit when desired in any well-known manner, for example, by disconnecting the elements and making direct connection as indicated in dotted lines. If it is desired to vary the transmission equivalent of the circuit by steps, the impedance elements may comprise a plurality of sections which may be connected in the circuit one or more at a time as indicated in Figure 13. By an arrangement such as above described, it is possible to adjust the four-wire circuit so as to obtain any desired transmission equivalent between the terminating stations. It is also possible, by varying the impedance elements or connecting them in circuit by steps, to maintain the transmission equivalent at the desired value, regardless of any changes which may take place from time to time in one or more of the elements of the four-wire circuit. An arrangement such as above described also readily lends itself to the adjustment of transmission which is necessary where the four-wire repeater arrangement is used to connect terminating lines having different characteristics, as will be more fully explained hereinafter.

Figure 2:
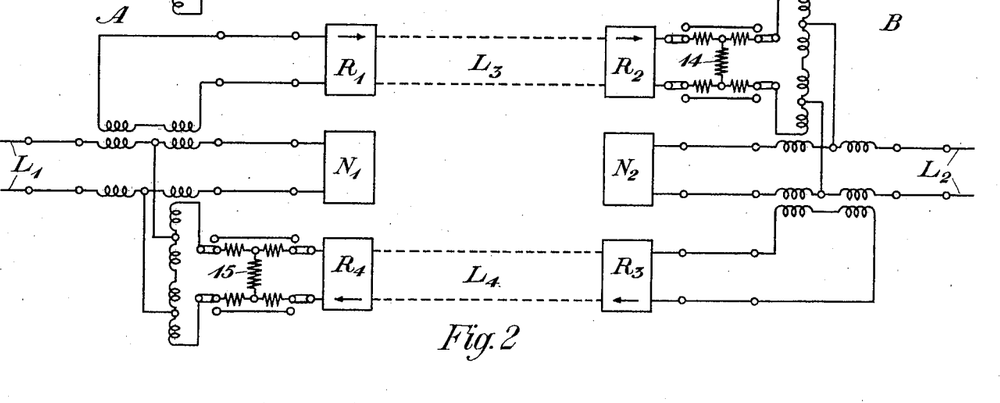
Figure 3:
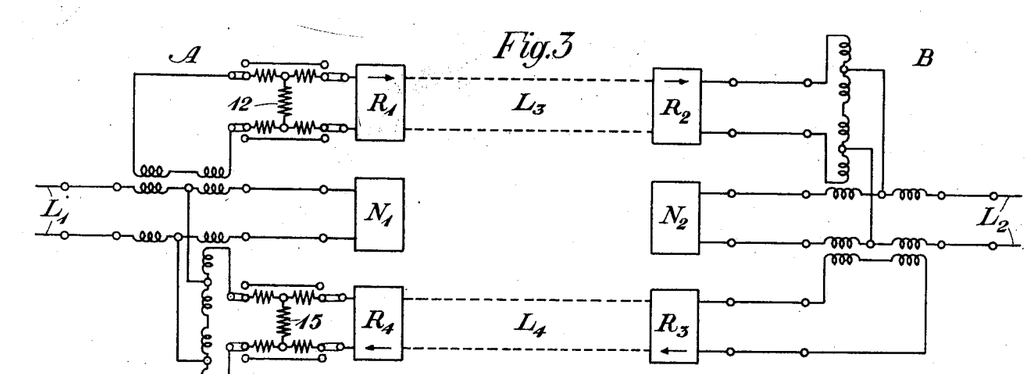

Instead of arranging the impedance elements as shown in Figure 1, substantially the same results may be obtained by inserting impedance elements, such as 14 and 15, at the in-coming ends of the lines $L_3$ and $L_4$, as shown in Figure 2. Another arrangement is shown in Figure 3, in which impedance elements 12 and 15 are inserted in line $L_3$ and $L_4$, respectively, at the station A.

Figure 4:
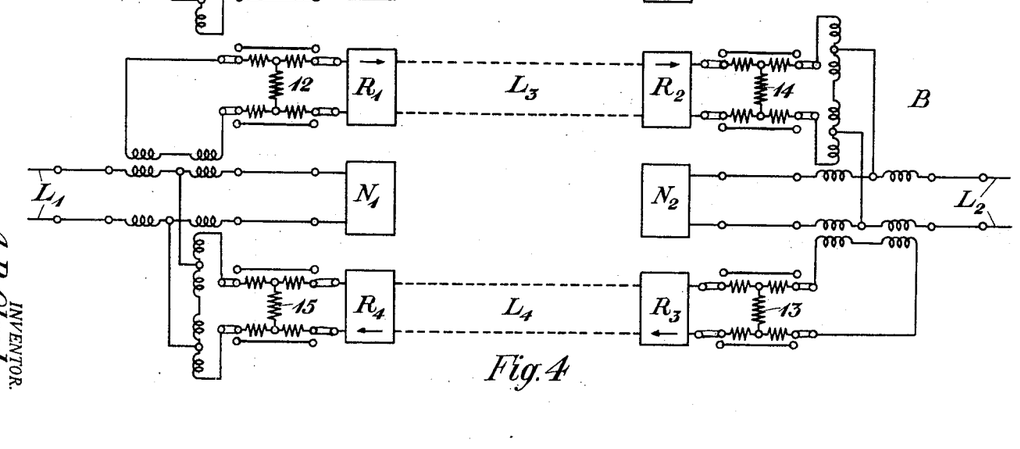

A still further modification is shown in Figure 4, in which the impedance elements 12, 13, 14 and 15, are inserted in each side of the four-wire circuit at each terminating station. It will be readily understood, of course, that the impedance elements may in general be arranged at other points in the four-wire circuit, the only requirement being that similar elements be included in both sides of the circuit.

Figure 5:
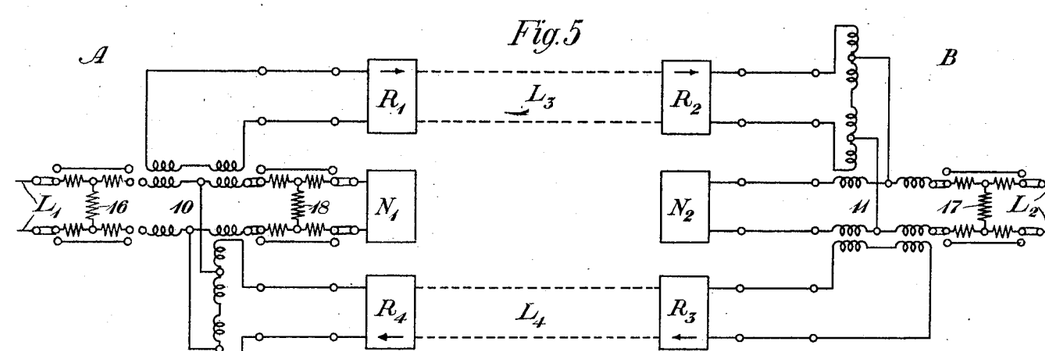

Instead of controlling the transmission over the four-wire system by inserting impedance elements in the four-wire link, results equivalent to those obtained by the arrangements already described may be secured by inserting impedance elements in the terminating two-wire lines. Such an arrangement is shown in Figure 5, in which impedance elements, 16 and 17, are inserted in the terminating lines $L_1$ and $L_2$. In four-wire systems of this character each two-wire line is balanced by an artificial line or network, lines $L_1$ and $L_2$ being balanced in the arrangement shown by the networks $N_1$ and $N_2$. In order that a proper balance may be maintained it will in general be necessary to balance the impedance element, such as 16, inserted in the line, by an equivalent impedance element, such as 18. In certain cases, however, as will be brought out later, this will be unnecessary.

When an impedance element, such as 16, is connected to a two-wire line, such as $L_1$, which is of irregular structure, and therefore does not perfectly balance network $N_1$, and a duplicate impedance element, such as 18, is connected to the network $N_1$, the impedance of the combination of the two-wire line $L_1$ and the impedance element 16 as viewed from the mid-points of the windings of the induction coil 10, will more closely balance the impedance of the combination of network $N_1$ and impedance element 18 as viewed from the same mid-points than will the impedance of line $L_1$ balance that of $N_1$ without these impedance elements. Hence since the transmission efficiency of a four-wire link depends very largely upon the degree of balance which it is possible to secure between the two-wire lines and networks, it will frequently be the case that with the four-wire link adjusted to give but a small loss it can not be worked with good quality when connected to a two-wire line such as $L_1$ but by the addition of impedance elements 16 and 18, which improve the balance condition, it will work satisfactorily.

As mentioned above, it is not always necessary to insert an impedance element, such as 18, between the network and the three-winding induction coil when an impedance element such as 16 is inserted between the two-wire line and the three-winding induction coil. Whenever the characteristics of the impedance element or elements which are inserted between the line and three-winding induction coil are similar to those of sections of the ideal line which the network is designed to simulate in impedance, it is unnecessary to connect these between the network and the three-winding induction coil. The object of connecting the impedance elements between the line and three-winding induction coil is to smooth out irregularities in the impedance of the line and since the impedance of the network is not irregular, there is no advantage in connecting impedance elements to it.

An important application of this is the case where due to the fact that the terminating two-wire line has very irregular impedance characteristics and is therefore not capable of being closely balanced by any simple commercial form of network, this line is merely roughly balanced by using a non-inductive resistance as a network. In such a case the impedance elements may be made up simply of non-inductive resistances which may be readily proportioned so that they will act as sections of an artificial line having non-inductive resistance as its characteristic impedance. In other words, the resistances comprising one of the impedance elements would be so proportioned that if this impedance element is connected between the network and the three-winding induction coil the impedance of the combination of impedance element and network, as viewed from the mid-points of the windings of the three-winding induction coil, would be the same as if the impedance element were removed and the network was seen alone.

Figure 6:
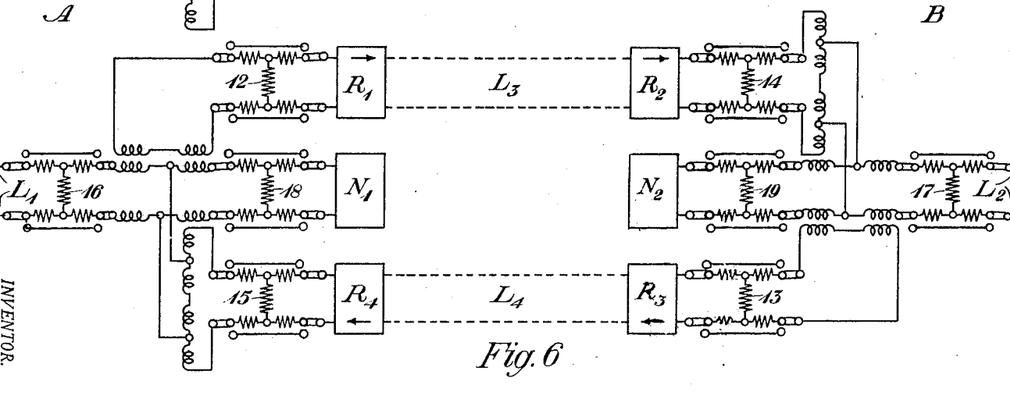

In some cases it may be desirable to employ a combination of all of the methods already outlined. Such an organization is illustrated in Figure 6, in which the four-wire link is provided with impedance elements, 12, 13, 14, and 15, in the two sides $L_3$ and $L_4$ of the circuit, while impedance elements 16 and 17 are inserted in the lines $L_1$ and $L_2$ respectively, said impedance elements being balanced by coresponding elements, 18 and 19, in the artificial line side of the circuit. Instead of using impedance elements of the form illustrated in Figures 1 to 6, inclusive, impedance elements such as that shown in Figure 10 may be used, or where greater refinement is desired the impedance element may be made up of more complicated structure such as the one shown in Figure 11, which consists of series of elements comprising resistances and inductances, and a shunt comprising a capacity and resistance in parallel.

Instead of using impedance elements of the types described, the same result can be obtained by substituting one-way repeaters in the sides of the four-wire circuit or two-way repeaters in the terminating two-wire lines.

Figures 7, 10, 11:
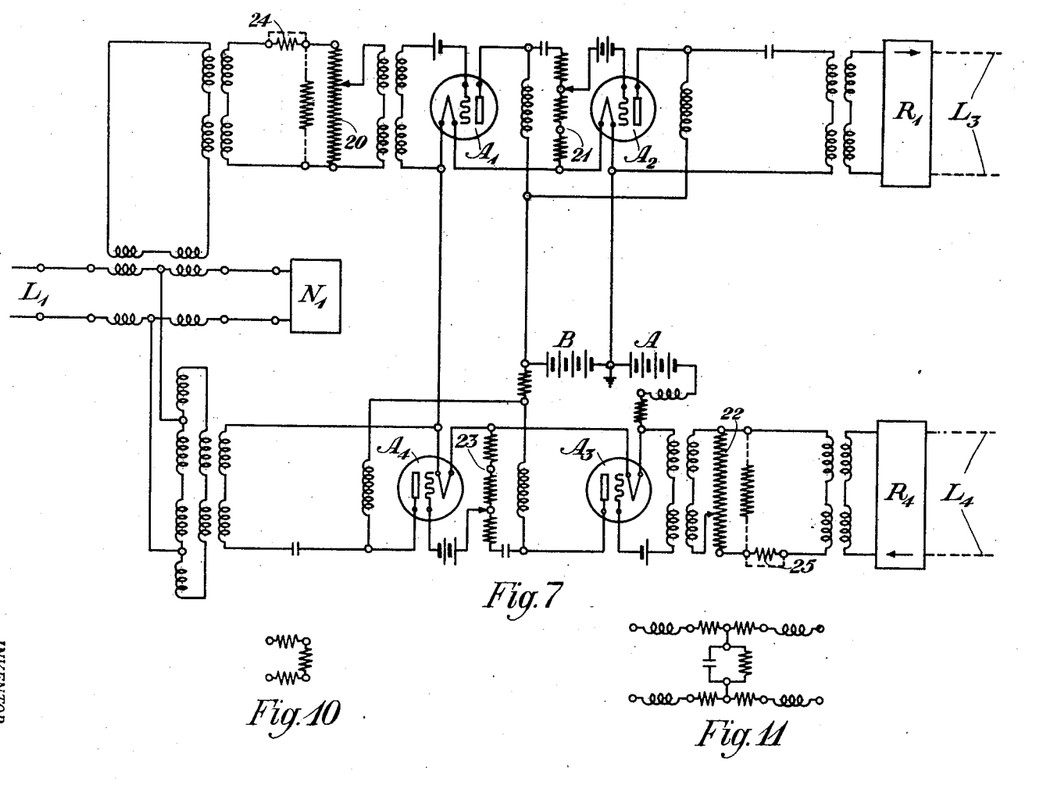

The use of repeaters has the additional advantage that the repeaters may be adjusted so that either a gain or loss in transmission is secured by their insertion in the circuit. A circuit arrangement using one-way repeaters of the vacuum tube type in the two sides of the four-wire link is shown in Figure 7. In this figure vacuum tube amplifiers $A_1$ and $A_2$ are inserted in the line $L_3$, and similar amplifiers $A_3$ and $A_4$ are inserted in the line $L_4$. The filaments of the amplifiers are connected in a series circuit and are heated by means of the battery A, while the space current is provided by the battery B. In order that the one-way repeaters may be caused to give either gains or losses, an adjustable potentiometer 20, is provided in the input circuit of the amplifier $A_1$ and a potentiometer 21, is provided in the input circuit of the amplifier $A_2$, the potentiometer 20 being adjustable by small steps while the potentiometer 21 is adjustable by large steps. Similarly, potentiometers 22 and 23 are provided for the input circuits of amplifiers $A_3$ and $A_4$. In addition to the potentiometers a combination of shunt and series resistances 24 and 25 may be connected into the circuit in front of the first potentiometer, in order to provide one additional fixed step. The arrangement just described while more complicated than the other methods set forth, is much more flexible and has the additional advantage that it permits of the insertion of either gains or losses in the transmission circuit.

Some of the advantages which may be secured by the use of the principles hereinbefore disclosed may be readily seen from a consideration of the following hypothetical situation:—

Figure 12:
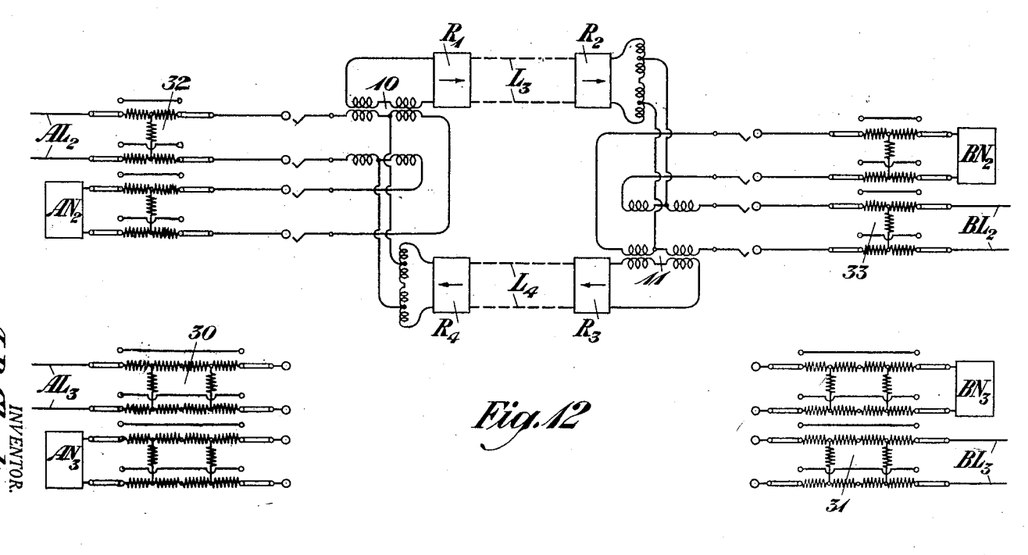
Figure 12 of which illustrates an adaptation of the principles of the invention.

Assume that two offices, A and B (see Figure 12) are connected by a four-wire link, and that at office A three two-wire lines, $AL_1$, $AL_2$ and $AL_3$ terminate, while similar lines, $BL_1$, $BL_2$ and $BL_3$ terminate at station B. Now suppose that lines $AL_3$ and $BL_3$ are similar and contain impedance irregularities such that when a connection is established between them by means of the four-wire link, the four-wire link must have a transmission equivalent of at least five miles in order to avoid a poor quality of transmission. Suppose, also, that lines $AL_2$ and $BL_2$ are similar and of such character that the four-wire link connecting them can be worked at a zero transmission equivalent, or, in other words, with its repeaters so adjusted with respect to the attenuation and other losses that no resultant loss in transmission occurs. Further, suppose that lines $AL_1$ and $BL_1$ are similar and of such character that it is possible to work the four-wire link connecting them in such a manner as to secure an actual gain in transmission between the two stations A and B, so that the transmission equivalent of the four-wire link will be minus five miles. It is now obvious that if the four-wire link is adjusted to give the best transmission possible when worked between lines $AL_2$ and $BL_2$, it will not be working at maximum efficiency between lines $AL_1$ and $BL_1$ and will be unworkable between lines $AL_3$ and $BL_3$ because in the latter case the gain is greater than the conditions of balance will permit. It is therefore necessary that the circuit be adjusted so that it will give a transmission of plus five miles when lines $AL_3$ and $BL_3$ are connected, a transmission equivalent of zero when lines $AL_2$ and $BL_2$ are connected and a transmission equivalent of minus five miles when lines $AL_1$ and $BL_1$ are connected. This adjustment may be accomplished by adding impedance elements to the four-wire link proper in any of the ways proposed in Figures 1 to 4 inclusive, or the desired effect may be obtained by adding impedance elements to the two-wire lines according to the method illustrated in Figure 5. For example, as shown in Figure 12, if two equal impedance elements, such as 30 and 31, which introduce a total loss of ten miles, are connected to the two-wire lines AL$_3$ and BL$_3$ and similar equal impedance elements 32 and 33 which will cause a total loss of five miles are added to the lines AL$_2$ and BL$_2$, (suitable balancing elements being included in the artificial line), a four-wire link may be worked at full transmission efficiency between any combination of these lines, as for instance, between the lines AL$_1$ and BL$_1$, AL$_2$ and BL$_2$, etc., or between such combinations as AL$_1$ and BL$_2$, AL$_2$ and BL$_3$, etc. When the two-wire lines to which the impedance elements have been added are to be used for terminating business or for other connections in which it is not desirable to introduce this additional loss, the impedance elements may be disconnected from the lines by any suitable means such as, for instance, a relay arrangement as indicated by the switches in Figure 12.

Another condition for which it may be most expedient to control the transmission by adding losses or gains to the two-wire lines instead of to the two sides of the four-wire link, is in a case where two-four-wire circuits are operated independently part of the time but are occasionally connected together in tandem to form a long continuous circuit. Suppose, for instance, that each of two four-wire circuits, such as shown in Figure 5, is adjusted so that its transmission equivalent when worked independently of the other is ten miles. If, now, the two circuits are connected together in tandem, unless transmission gains are added the equivalent of the long circuit will be twenty miles. If it is desirable to obtain a better grade of transmission than twenty miles, say ten miles, from the long circuit, this may be accomplished by the insertion of an amplifying arrangement, such as a two-way telephone repeater between the two four-wire circuits, by the insertion of such a repeater at either terminal of the circuit, or by the addition of amplifiers in pairs to the sides of one or both of the four-wire circuits or by the elimination of apparatus producing losses.

Figure 8:
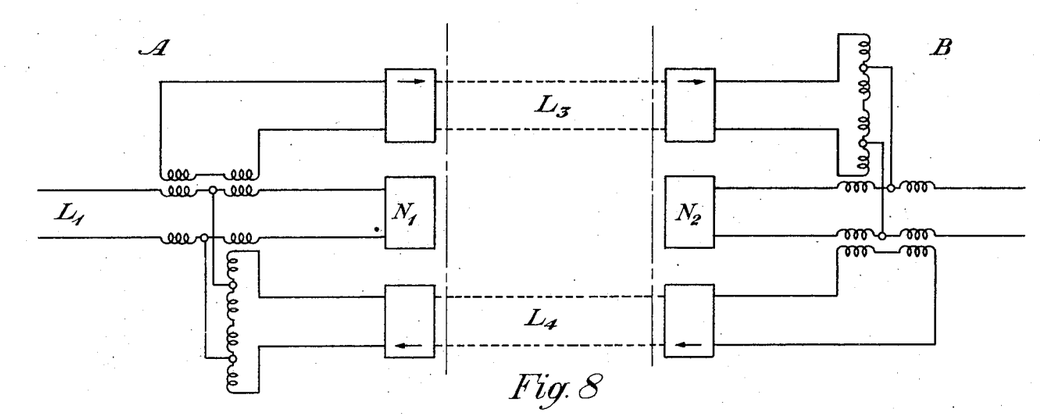
Figure 8A:
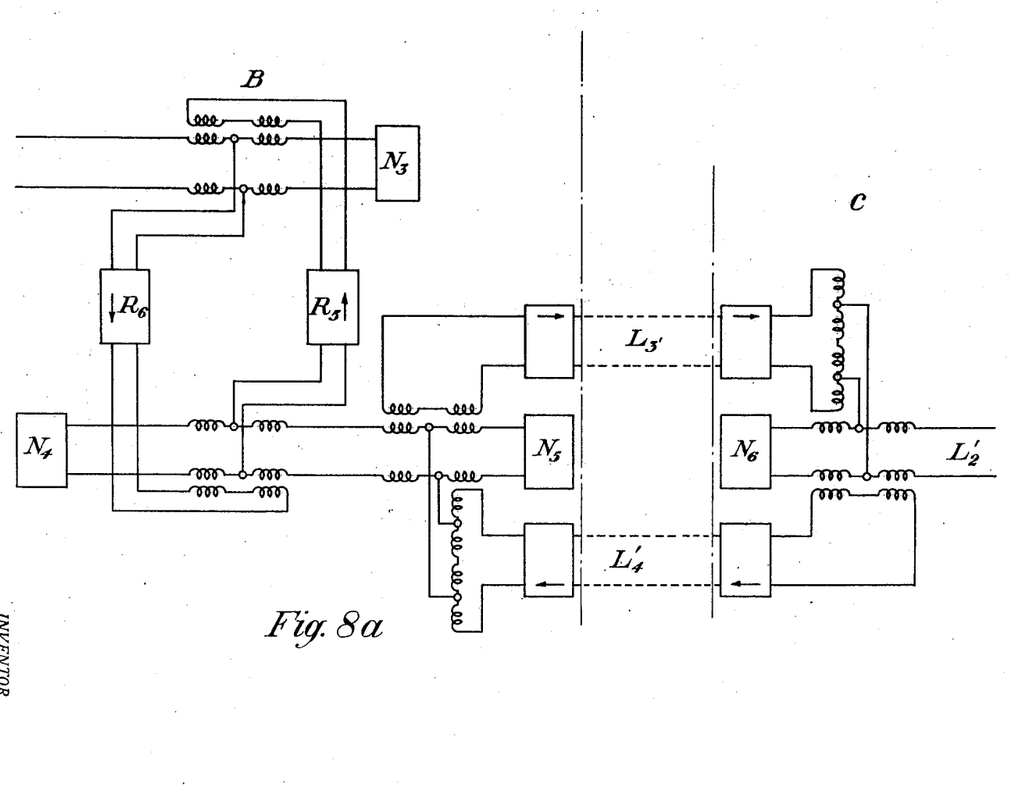
Figure 9:
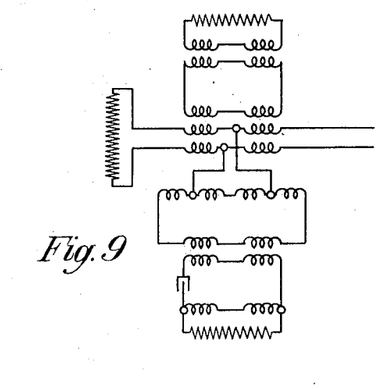
Figure 9 of which is a diagram of a network to be used in connection with the circuit of Figure 8.

If the expedient of adding amplifiers in pairs to the sides of the four-wire circuits is to be availed of, the circuit arrangement shown in Figure 7 may be utilized, and the amplifiers A$_1$ A$_2$, A$_3$ and A$_4$ adjusted by means of their potentiometers to secure the desired gain. The use of a two-way repeater connected between the two four-wire links for the purpose of overcoming the loss caused by the connection of the two links in tandem, is illustrated in Figures 8 and 8$^a$, which when placed end to end form a complete diagram. In this diagram a four-wire circuit, including the transmission lines L$_3$ and L$_4$, and a second four-wire circuit, including the transmission lines L$_3'$ and L$_4'$ are connected in tandem between the two-wire lines L$_1$ and L$_2'$. Between the two four-wire links a two-way repeater, including repeater elements R$_5$ and R$_6$ is connected. The two-way repeater and its associated parts are balanced with respect to the first mentioned four-wire link by means of an artificial line or network, N$_2$, while the elements of the four-wire link are balanced with respect to the two-wire repeater by means of the network, N$_3$. In a similar manner the four-wire link connected to the line L$_2'$ and the two-way repeater are balanced by the network N$_4$ and N$_5$, respectively. The elements making up the arrangement just described are well known in the art, with the exception of the networks N$_2$. N$_3$, N$_4$ and N$_5$. These networks may be made up of various pieces of apparatus so as to duplicate with great exactness corresponding pieces of apparatus in the circuit which is to be balanced, and in this manner a very accurate balance is possible. Figure 9 shows an arrangement which might be used for networks N$_3$ and N$_4$.

While the above embodiments of the invention have disclosed its application to transmission circuits employing repeaters of the so-called four-wire type, it is obvious that it may be applied equally well to other two-way repeater systems.

It will also be obvious that the general principles herein disclosed may be embodied in many other organizations widely different from those disclosed without departing from the spirit of the invention as defined in the following claims.

What is claimed is:

1. A transmission circuit involving a connecting four-wire link and terminating two-wire lines, said four-wire link including amplifiers and potentiometers for controlling the gain of the amplifiers, and means associated with said transmission circuit for controlling the transmission thereover, said means comprising varying impedance elements and means for inserting said impedance elements in each side of the four-wire link at will so that transmission over the circuit including the terminating two-wire lines and four-wire link passes through said impedance elements and for disconnecting said impedance elements from each side of the four-wire link at will without interrupting the transmission of energy through the circuit.

2. A transmission circuit involving a connecting four-wire link and terminating two-wire lines, said four-wire link including amplifiers and potentiometers for controlling the gain of the amplifiers, and means for controlling the transmission over said transmission circuit, said means comprising an element variable to produce gains or losses and arrangements whereby said element may be inserted in the transmission circuit at will so that transmission over the circuit takes place through said element and whereby said element may be disconnected from the circuit at will without interrupting transmission through the circuit.

3. In a transmission circuit, a pair of terminating-two-wire lines, a four-wire link interconnecting the lines, and means to control the transmission equivalent of the circuit, said means comprising an element adjustable to produce either a loss or gain in transmission and means whereby said element may be included in the circuit at will so that transmission over the circuit takes place through said element and whereby said element may be disconnected from the circuit without interrupting transmission over the circuit.

4. In a transmission circuit a pair of terminating lines, a four-wire link interconnecting the lines, and means to control the transmission equivalent of the circuit consisting of adjustable impedance elements and means whereby said elements may be inserted in each side of the four-wire link at will so that transmission takes place over said link through said elements and whereby said elements may be disconnected from the four-wire link without interrupting transmission through each side of said link.

5. In a transmission circuit a pair of terminating lines, a four-wire link interconnecting the lines, and means to control the transmission equivalent of the circuit consisting of impedance elements adapted to be inserted in the terminating lines.

6. In a transmission circuit, a pair of terminating lines, a two-way repeater system interconnecting said lines, means associated with said repeater system for balancing said lines and means to control the transmission equivalent of the circuit consisting of impedance elements adapted to be inserted in the terminating lines.

7. In a transmission circuit a pair of terminating lines, a four-wire link interconnecting the lines, and means to control the transmission equivalent of the circuit consisting of impedance elements adapted to be inserted in each side of the four-wire link, and impedance elements adapted to be inserted in the terminating two-wire lines.

8. In combination, a plurality of lines having different characteristics, connecting means having a fixed transmission equivalent for interconnecting any two of said lines and means whereby said connecting means may be worked at its greatest efficiency between any two of said lines, said means comprising impedance elements adjustable in accordance with the requirements of any two interconnected lines and means whereby said impedance elements may be connected in the transmission circuit comprising two interconnected lines and said connecting means so that transmission over the circuit passes through said impedance elements and whereby said impedance elements may be disconnected from the circuit without interrupting transmission from the one line to the other through the interconnecting means.

9. In combination, a plurality of lines having different characteristics, connecting means for interconnecting said lines and means for compensating the difference in the characteristics of the lines comprising impedance elements variable in accordance with the characteristics of the lines which are interconnected and means for including said impedance elements in the transmission circuit including two transmission lines and said connecting means so that transmission over the circuit passes through said impedance elements and for disconnecting said impedance elements from the circuit without interrupting transmission from one transmission line through said connecting means to the other.

10. In a telephone system a plurality of stations, terminating lines at each of said stations, four-wire links extending between pairs of stations, said links being adapted to interconnect terminating lines at the stations connected by said links, said links being also adapted to be connected in tandem between terminating lines at distant stations, and means for compensating the difference in transmission between a tandem circuit and a circuit involving a single link, said means comprising variable transmission elements and means for inserting said elements in one of said circuits at will.

In testimony whereof, I have signed my name to this specification this 24th day of April, 1918.

ALVA B. CLARK.